United States Patent
Kim (10) Patent No.: US 8,682,319 B2
(45) Date of Patent: Mar. 25, 2014

(54) TERMINAL FOR ENTERING COVERAGE OF SMALL BASE STATION, SMALL BASE STATION, NETWORK APPARATUS, AND METHOD

(75) Inventor: Dong Hyun Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 569 days.

(21) Appl. No.: 12/904,777

(22) Filed: Oct. 14, 2010

(65) Prior Publication Data

US 2011/0105116 A1   May 5, 2011

(30) Foreign Application Priority Data

Nov. 3, 2009   (KR) ........................ 10-2009-0105467

(51) Int. Cl.
*H04W 4/00*   (2009.01)

(52) U.S. Cl.
USPC ......... 455/434; 455/522; 455/436; 455/435.2

(58) Field of Classification Search
USPC ................. 455/522, 450, 509, 458, 574, 434, 455/456.1, 67.11, 552.1, 88, 524, 525, 13.1, 455/456.5, 456.6, 464, 420, 436, 435.2, 455/435.1, 444, 452.1; 370/252, 254, 331, 370/401, 311, 338; 713/171
See application file for complete search history.

(56) References Cited

U.S. PATENT DOCUMENTS

| 8,301,151 | B2 * | 10/2012 | Back | 455/444 |
|---|---|---|---|---|
| 2005/0037758 | A1 * | 2/2005 | Rimoni | 455/436 |
| 2006/0025181 | A1 * | 2/2006 | Kalofonos et al. | 455/574 |
| 2006/0094450 | A1 * | 5/2006 | Park et al. | 455/458 |
| 2006/0120314 | A1 * | 6/2006 | Krantz et al. | 370/311 |
| 2007/0250713 | A1 * | 10/2007 | Rahman et al. | 713/171 |
| 2008/0028404 | A1 * | 1/2008 | Oh et al. | 718/100 |
| 2008/0247361 | A1 * | 10/2008 | Jung et al. | 370/331 |
| 2008/0293419 | A1 | 11/2008 | Somasundaram et al. | |
| 2009/0061954 | A1 * | 3/2009 | Syed | 455/574 |
| 2009/0104905 | A1 * | 4/2009 | DiGirolamo et al. | 455/434 |
| 2009/0161626 | A1 * | 6/2009 | Crawford et al. | 370/331 |
| 2009/0285143 | A1 * | 11/2009 | Kwun et al. | 370/311 |
| 2010/0151858 | A1 * | 6/2010 | Brisebois et al. | 455/434 |
| 2010/0151920 | A1 * | 6/2010 | Song et al. | 455/574 |
| 2011/0026424 | A1 * | 2/2011 | Feder et al. | 370/252 |
| 2011/0053604 | A1 * | 3/2011 | Kim et al. | 455/450 |
| 2011/0218004 | A1 * | 9/2011 | Catovic et al. | 455/509 |
| 2012/0190374 | A1 * | 7/2012 | Jo et al. | 455/450 |
| 2012/0204049 | A1 * | 8/2012 | Syed | 713/323 |
| 2013/0059585 | A1 * | 3/2013 | Giloh | 455/436 |

FOREIGN PATENT DOCUMENTS

| JP | 2003-124940 | 4/2003 |
|---|---|---|
| JP | 2004-165755 | 6/2004 |
| JP | 2005-109570 | 4/2005 |
| JP | 2009-049485 | 3/2009 |

(Continued)

*Primary Examiner* — Tan Trinh
(74) *Attorney, Agent, or Firm* — H.C. Park & Associates, PLC (57) ABSTRACT

A terminal for entering a coverage of a small base station, a network apparatus, and a method for operating the same are provided. The network apparatus controls small base stations, on which the terminal is camped, to operate in an active mode in which the small base station emits radio frequency (RF) signals, and controls small base stations, accessible by the terminal but not camped on by the terminal, to operate in an inactive mode in which the small base station does not emit RF signals.

20 Claims, 4 Drawing Sheets

(56) References Cited

FOREIGN PATENT DOCUMENTS

| KR | 1020030094422 | 12/2003 |
| KR | 1020050082508 | 8/2005 |
| KR | 1020050097722 | 10/2005 |
| KR | 1020060019007 | 3/2006 |
| KR | 1020060043401 | 5/2006 |
| WO | 2009/022533 | 2/2009 |
| WO | 2009/048887 | 4/2009 |

* cited by examiner

| Header (mandatory) | UE ID (mandatory) | Optional parameters (optional) |
|---|---|---|

FIG. 4

| Header (mandatory) | UE ID (mandatory) | CSG ID (optional) | UE LOCATION INFORMATION (optional) |
|---|---|---|---|

FIG. 5

| Header (mandatory) | UE ID (mandatory) | Result (mandatory) |
|---|---|---|

FIG. 6

TERMINAL FOR ENTERING COVERAGE OF SMALL BASE STATION, SMALL BASE STATION, NETWORK APPARATUS, AND METHOD

CROSS-REFERENCE TO RELATED APPLICATION

This application claims priority from and the benefit under 35 U.S.C. §119(a) of Korean Patent Application No. 10-2009-0105467, filed on Nov. 3, 2009, which is hereby incorporated by reference for all purposes as if fully set forth herein.

BACKGROUND

1. Field

The following description relates to a terminal for entering a coverage of a small base station, a network apparatus, and a method for operating the same.

2. Discussion of the Background

During booting, a small base station operates in an active mode (i.e., a state in which the small base station emits radio frequency (RF) signals), and a network apparatus manages location information of multiple small base stations and information related to RF parameters.

A terminal selects to enter a coverage of one small base station from among detected small base stations, and requests registration to the selected small base station. If the terminal receives a response to the registration request from the small base station, the terminal can be provided with a service from the small base station. In this instance, the terminal may automatically select one small base station from among the small base stations detected on the basis of specified criteria according to an automatic closed subscriber group (CSG) selection method. Alternatively, the terminal may display a list of detected small base stations and receive one small base station input according to a manual CSG selection method.

Here, although only one small base station from among the small base stations operating in an active mode offers a service to a terminal, the small base stations other than the servicing small base station still operate in an active mode.

Due to the small base stations operating in the active mode, RF signals are unnecessarily emitted from small base stations on which a terminal is not camped, and such indirect signals may affect the served terminal.

SUMMARY

Exemplary embodiments of the present invention provide a terminal for entering a coverage of a small base station, a small base station, a network apparatus, and a method in which interference between active small base stations is decreased.

Additional features of the invention will be set forth in the description which follows, and in part will be apparent from the description, or may be learned by practice of the invention.

An exemplary embodiment of the present invention discloses a network apparatus including a node list search unit to search for small base stations accessible to a terminal in response to a request for closed subscriber group (CSG) selection from the terminal; a first controller to control the accessible small base stations to operate in an active mode; and a second controller to control a first small base station, on which the terminal is camped, from among the accessible small base stations to maintain the active mode, and to control the remaining of the accessible small base stations, on which the terminal is not camped, to switch from the active mode to an inactive mode and to operate in the inactive mode.

An exemplary embodiment of the present invention discloses a method for operating a network system, including searching for small base stations accessible to a terminal in response to a closed subscriber group (CSG) selection request from the terminal; controlling the accessible small base stations to operate in an active mode; determining whether the terminal is camped on a first small base station, the first small base station being one of the accessible small base stations; and controlling the first small base station, on which the terminal is camped, to maintain the active mode, and controlling the remaining accessible small base stations, on which the terminal is not camped, to switch from the active mode to an inactive mode and to operate in the inactive mode.

An exemplary embodiment of the present invention discloses a small base station including a controller to determine one of an active mode and an inactive mode depending on whether the small base station senses signals from a macro cell, to control RF signal emission based on the determined mode, and to switch a mode of the small base station in response to a mode switch request received from a network apparatus.

An exemplary embodiment of the present invention discloses a terminal including a communication unit to transmit a closed subscriber group (CSG) selection request to a network apparatus; a node detection unit to detect small base stations after receiving a CSG selection response from the network apparatus in response to the CSG request; and a node access unit to enter a coverage of a selected small base station by camping on the selected small base station from among the detected small base stations, wherein the network apparatus controls a small base station accessible by the terminal to operate in an active mode in which the small base station emits RF signals, and controls a small base station, on which the terminal is not camped, from among the small base stations operating in the active mode, to operate in an inactive mode in which the small base station does not emit RF signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. The relative size and depiction of these elements may be exaggerated for clarity, illustration, and convenience.

It will be understood that when an element is referred to as being "connected to" another element, it can be directly connected to the other element, or intervening elements may be present.

Hereinafter, a terminal for entering a coverage of a small base station, a small base station, a network apparatus, and a method for operating the same according to exemplary embodiments of the present invention will be described in detail with reference to the accompanying drawings.

Figure 1:
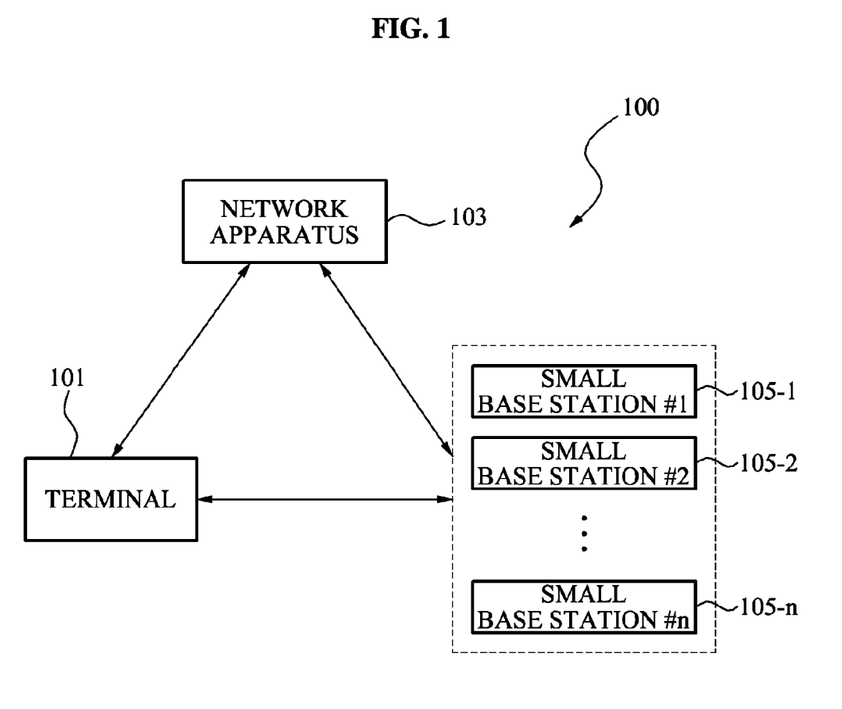
FIG. 1 is a diagram illustrating a terminal for entering a coverage of a small base station, small base stations, and a network apparatus according to an exemplary embodiment of the present invention.
Figure 2:
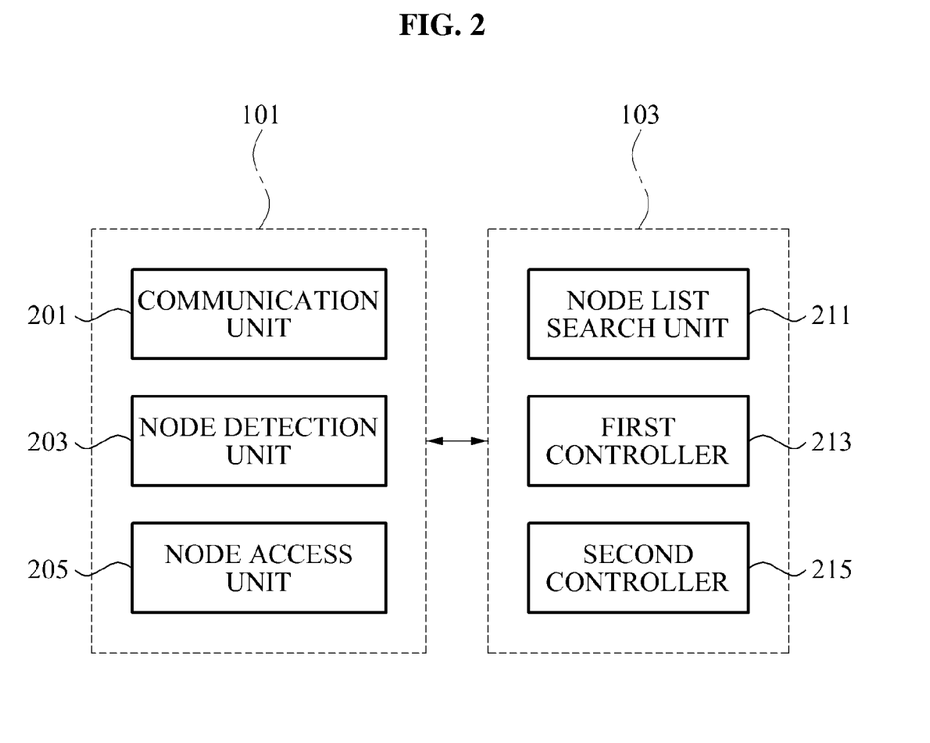
FIG. 2 is a diagram illustrating structures of the terminal for entering a coverage of the small base station and the network apparatus of FIG. 1, according to an exemplary embodiment of the present invention.

FIG. 1 is a diagram illustrating a terminal for entering a coverage of a small base station, a network apparatus, and the relationship between the terminal and the network apparatus according to an exemplary embodiment of the present invention. FIG. 2 is a diagram illustrating the structures of the terminal for entering a coverage of the small base station and the network apparatus of FIG. 1 according to an exemplary embodiment of the present invention.

Referring to FIG. 1 and FIG. 2, a system 100 according to an exemplary embodiment of the present invention comprises a terminal 101, a network apparatus 103, and small base stations 105-1 to 105-*n* (where 'n' is a natural number).

The terminal 101 includes a communication unit 201, a node detection unit 203, and a node access unit 205.

The communication unit 201 requests to begin detection of the small base stations 105-1 to 105-*n* by transmitting a closed subscriber group (CSG) selection request to the network apparatus 103. Here, the communication unit 201 may communicate with the network apparatus 103 via a base station.

Figure 3:
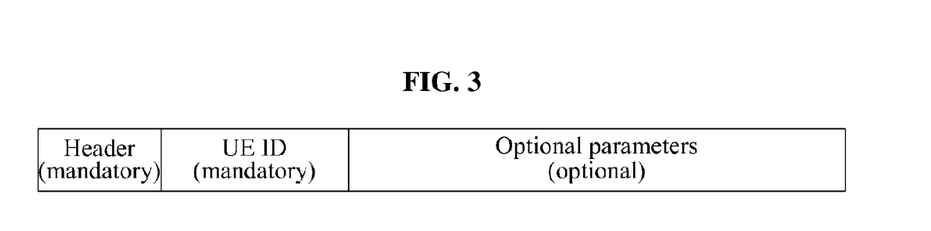
FIG. 3, FIG. 4, and FIG. 5 illustrate structures of closed subscriber group (CSG) selection request and response messages of a terminal for entering a coverage of a small base station and a network apparatus according to exemplary embodiments of the present invention.

Specifically, the communication unit 201 may request to begin detection of the small base stations 105-1 to 105-*n* by transmitting a CSG selection request message, as shown in FIG. 3, to the network apparatus 103.

Figure 4:
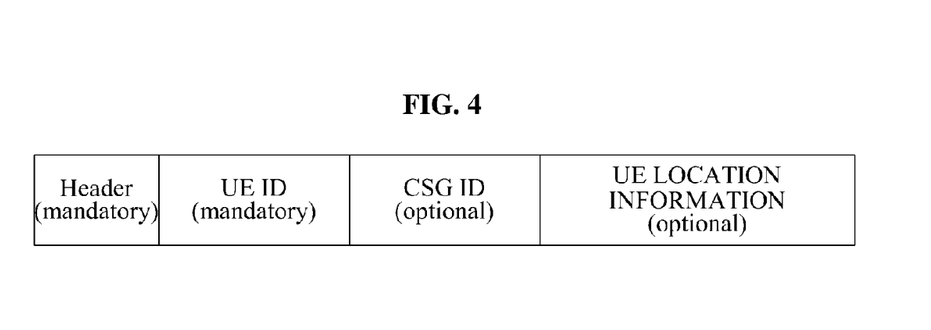

Referring to FIG. 3, the CSG selection request message may include a header of the message, a user equipment identifier (UE ID) representing identification information of the terminal 101, and optional parameters. As shown in FIG. 4, the CSG selection request message is not limited thereto, and may further contain a small base station ID (CSG ID) representing identification information of the small base stations 105-1 to 105-*n*, or location information of the terminal (UE location information).

Figure 5:
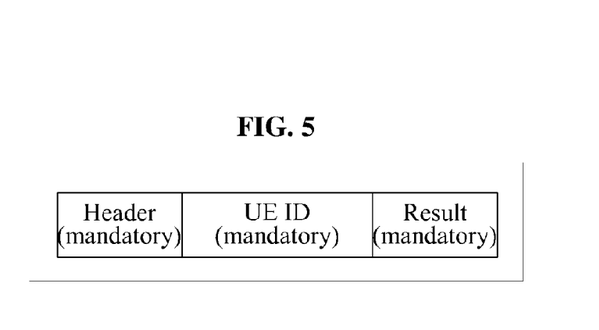

If the node detection unit 203 receives a response to the CSG selection request to begin detection of small base stations from the network apparatus 103, the node detection unit 203 detects the small base stations 105-1 to 105-*n*. In this instance, the node detection unit 203 may receive a response to the CSG selection request for small base station detection start by receiving a CSG selection response message, as shown in FIG. 5, through the communication unit 201. Referring to FIG. 5, the response message to the CSG selection request to begin detection of small base stations 105-1 to 105-*n* may have a header of the message, a UE ID representing identification information of the terminal 101, and a result (accept or deny) of the small base stations 105-1 to 105-*n* that received an active mode request from the network apparatus 103.

Also, the node detection unit 203 may perform a manual CSG selection operation to detect nearby small base stations through power measurement, and may display a list of detected small base stations and associated power measurements.

The node access unit 205 enters a coverage of a selected small base station among the detected small base stations by completing a registration procedure in the selected small base station. Specifically, the node access unit 205 receives one small base station input by a user or selected automatically by the terminal 101 from the list of detected small base stations, and, after receiving a response to a registration request from the selected small base station, camps on the corresponding small base station, so that the node access unit 205 is provided with a service from the small base station on which the terminal 101 is camped.

Each of the small base stations 105-1 to 105-*n* may include a transceiver (not shown) to send and receive signals, and a controller to determine one of an active mode and an inactive mode, to control (not shown) RF signal emission, and to switch a mode of the small base station. The controller the small base station 105-1 to 105-*n* may respectively determine the active mode and inactive mode of the small base station 105-1 to 105-*n* depending on whether the small base station 105-1 to 105-*n* senses signals from a macro cell (not shown). The controller may control RF signal emission of the small base station 105-1 to 105-*n* based on the determined mode, i.e., the small base station 105-1 to 105-*n* may transmit RF signals in the active mode and may not transmit RF signals in an inactive mode. The controller of the small base station 105-1 to 105-*n* may switch a mode of the small base station 105-1 to 105-*n* in response to a mode switch request received from a network apparatus 103.

The network apparatus 103 includes a node list search unit 211, a first controller 213, and a second controller 215.

If the node list search unit 211 receives the CSG selection request from the terminal 101 to begin detection of the small base stations 105-1 to 105-*n* via a network, the node list search unit 211 searches for small base stations 105-1 to 105-*n* accessible to the terminal 101. In this instance, if the node list search unit 211 receives the CSG selection request to begin detection of small base stations 105-1 to 105-*n* from the terminal 101 via a base station, the node list search unit 211 may search for small base stations 105-1 to 105-*n* to which the terminal 101 is subscribed by using the identification information of the terminal 101.

For example, if the node list search unit 211 receives a CSG selection request to begin detection of the small base stations 105-1 to 105-*n* from the terminal 101, the node list search unit 211 may search for a small base station #1 105-1 and a small base station #2 105-2, to which the terminal 101 is subscribed, from among the small base stations 105-1 to 105-*n* using identification information of the terminal 101.

The node list search unit 211 may receive identification information of small base stations 105-1 to 105-*n* to which the terminal 101 is subscribed from a subscribed node list server (not shown), and search for the small base stations 105-1 to 105-*n* to which the terminal 101 is subscribed based on the identification information.

The node list search unit 211 may receive location information of the terminal 101 from the terminal 101, and may search for small base stations 105-1 to 105-n positioned within a specific distance from the terminal 101 based on the location information. Also, the node list search unit 211 may receive from the terminal 101 identification information of selected small base stations from among the small base stations 105-1 to 105-n on the basis of an access history related to previous access to the small base stations 105-1 to 105-n, and may search for the selected small base stations corresponding to the identification information. In this instance, the node list search unit 211 may extract location information of the terminal 101 or identification information of the small base stations 105-1 to 105-n from the CSG selection request message transmitted from the terminal 101 to request starting of detection of the small base stations 105-1 to 105-n.

The first controller 213 of the network apparatus 103 controls the found small base stations 105-1 to 105-n to operate in an active mode by transmitting an active mode request to the found small base stations 105-1 to 105-n, the found small base stations 105-1 to 105-n being found as a result of the search performed by the node list search unit 211. In this instance, the found small base stations 105-1 to 105-n may operate in an active mode or in an inactive mode, however all the found small base stations may operate in an active mode under control of the first controller 213.

For example, if the small base station #1 105-1 and the small base station #2 105-2 are found, the first controller 213 controls the found small base station #1 105-1 and the found small base station #2 105-2 to operate in an active mode. In this instance, an active mode of a small base station 105-1 to 105-n is a state in which the small base station 105-1 to 105-n emits RF signals and can offer a service to the terminal 101. Conversely, an inactive mode of a small base station 105-1 to 105-n is a state in which the small base station 105-1 to 105-n does not emit RF signals and cannot offer a service to the terminal 101. The small base stations 105-1 to 105-n may be switched to an active mode or to an inactive mode by the network apparatus 103.

Also, if the first controller 213 receives a response to the active mode request from the small base stations 105-1 to 105-n which received the active mode request, the first controller 213 transmits a CSG selection response message to the terminal 101. The response to the active mode request transmitted from the small base stations 105-1 to 105-n may be, for example, an active mode OK message.

The second controller 215 controls one of the small base stations 105-1 to 105-n, on which the terminal 101 is camped to maintain an active mode, and controls a small base station 105-1 to 105-n, on which the terminal 101 is not camped, to switch from an active mode to an inactive mode and operate in the inactive mode.

After the second controller 215 receives the CSG selection complete message from the small base station 105-1 to 105-n, the second controller 215 determines whether the terminal 101 is camped on one of the small base stations 105-1 to 105-n. Here, the one of the small base stations 105-1 to 105-n, on which the terminal 101 is camped, is a small base station selected by the terminal 101.

For example, the second controller 215 may control the small base station #1 105-1, on which the terminal 101 is camped, to operate in active mode, and control the small base station #2 105-2, on which the terminal 101 is not camped, to switch from an active mode to an inactive mode and to operate in an inactive mode.

Accordingly, the second controller 215 controls the small base stations 105-1 to 105-n, which do not offer a service to the terminal 101, to operate in an inactive mode, thereby decreasing interference that may affect the terminal 101.

Initially, each of the small base stations 105-1 to 105-n boots and operates in a mode determined according to whether each of the corresponding small base stations 105-1 to 105-n senses signals from a macro cell. For example, during booting, if the small base stations 105-1 to 105-n sense RF signals from a macro cell, the small base stations 105-1 to 105-n may operate in an inactive mode to decrease interference. Also, during booting, if the small base stations 105-1 to 105-n do not sense RF signals from the macro cell, the small base stations 105-1 to 105-n may operate in an active mode to cover dead spots or areas without coverage.

Each of the small base stations 105-1 to 105-n may be then controlled mode by the network apparatus 103 to respectively operate in active or inactive. In this instance, if the small base stations 105-1 to 105-n operate in an inactive mode and receive an active mode request from the network apparatus 103, the small base stations 105-1 to 105-n may switch to an active mode and operate in the active mode.

A small base station 105-1 to 105-n described herein may operate in any one of an active mode and an inactive mode depending on whether signals from a macro cell are sensed, may control RF signal emission based on the determined mode, and may switch between the active mode or the inactive mode in response to a mode switch request of a network apparatus 103. Here, the mode switch request may enable a small base station 105-1 to 105-n, on which a terminal 101 is camped, to operate in an active mode, and may enable a small base station 105-1 to 105-n, on which the terminal 101 is not camped, to operate in an inactive mode.

Also, if the small base stations 105-1 to 105-n operate in an active mode and the terminal 101 is camped on one of the small base stations 105-1 to 105-n, the corresponding small base station 105-1 to 105-n may maintain an active mode as controlled by the network apparatus 103, and the remaining small base stations 105-1 to 105-n, on which the terminal 101 is not camped, may switch from an active mode to an inactive mode as controlled by the network apparatus 103.

If a small base station 105-1 to 105-n senses RF signals from a macro cell during booting, the small base station 105-1 to 105-n is controlled to operate in an inactive mode and thus, prevents a small base station 105-1 to 105-n, which is not offering a service to a terminal 101, from acting as a source of interference to a serving small base station 105-1 to 105-n and the terminal 101 camped on the serving small base station 105-1 to 105-n.

A small base station 105-1 to 105-n, on which a terminal 101 is camped, is controlled to operate in an active mode, and a small base station 105-1 to 105-n, on which the terminal 101 is not camped, is controlled to operate in an inactive mode to prevent the small base station 105-1 to 105-n, on which the terminal 101 is not camped, from emitting RF signals, thereby minimizing interference.

Figure 6:
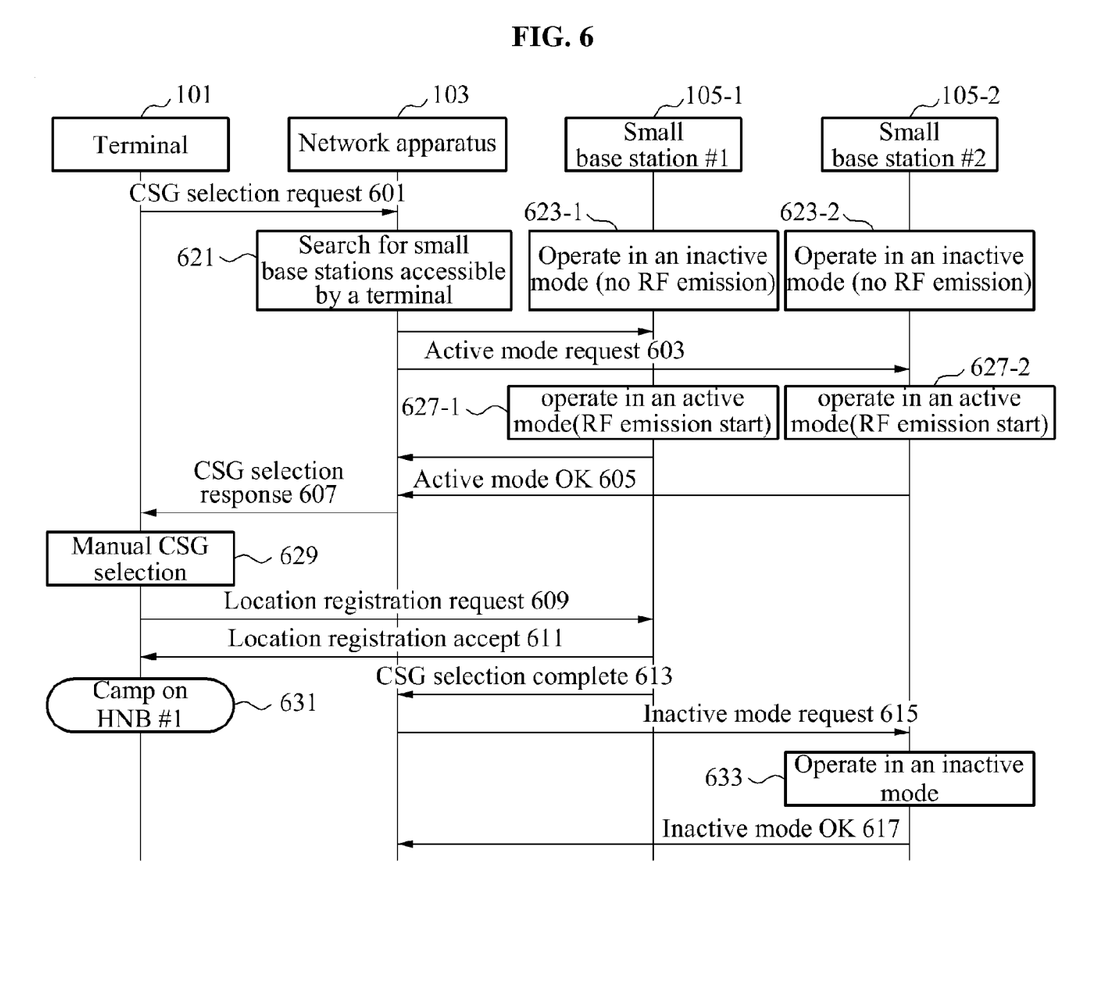
FIG. 6 is a flowchart illustrating a method for operating a terminal for entering a coverage of a small base station, small base stations, and a network apparatus according to an exemplary embodiment of the present invention.

FIG. 6 is a flowchart illustrating a method for operating a terminal for entering a coverage of a small base station and a network apparatus, according to an exemplary embodiment of the present invention.

Referring to FIG. 6, first, to begin detection of small base stations 105-1 to 105-n, the terminal 101 transmits a CSG selection request message to the network apparatus 103 via a base station in operation 601.

If the network apparatus 103 receives the CSG selection request message from the terminal 101 via the base station, the network apparatus 103 searches for small base stations accessible to the terminal 101 in operation 621. Further, the network apparatus 103 may search for small base stations to which the terminal 101 is subscribed by using identification information of the terminal 101 included in the CSG selection request message. Alternatively, the network apparatus 103 may receive small base stations to which the terminal 101 is subscribed from a subscribed node list server and search for the small base stations to which the terminal 101 is subscribed.

The network apparatus 103 may receive location information of the terminal 101 from the terminal 101, and may search for small base stations positioned within a specific distance from the terminal 101 based on the location information.

Also, the network apparatus 103 may receive from the terminal 101 identification information of small base stations selected on the basis of an access history related to previous access to the small base stations, and may search for the small base stations corresponding to the identification information. The node list search unit 211 may extract location information of the terminal 101 or identification information of the small base stations from the CSG selection request message transmitted to request starting of the detection of the small base stations.

The network apparatus 103 controls the found small base stations to operate in an active mode by transmitting an active mode request to the found small base stations. In this instance, the found small base stations may operate in an active mode or in an inactive mode; however, all of the found small base stations may operate in an active mode under control of the network apparatus 103.

The network apparatus 103 transmits an active mode request message to each of the small base station #1 105-1 and the small base station #2 105-2 in operation 603.

Initially, each of the small base station #1 105-1 and the small base station #2 105-2 may boot and operate in a mode determined according to whether signals from a macro cell are sensed. For example, during booting, if the small base station #1 105-1 and the small base station #2 105-2 sense RF signals from a macro cell, the small base station #1 105-1 and the small base station #2 105-2 may operate in an inactive mode in which RF signals are not emitted so as to decrease interference, as shown in operation 623-1 and operation 623-2. Here, whether the small base stations sense signals from a macro cell may be determined by checking whether the small base stations sense RF signals via their antennas, or may be determined by checking whether the small base stations are affected with RF signals via the network apparatus 103 using location information of the small base stations. Conversely, if the small base station #1 105-1 and the small base station #2 105-2 do not sense RF signals from a macro cell during booting, the small base station #1 105-1 and the small base station #2 105-2 may operate in an active mode to cover dead spots or areas without coverage.

If the small base station #1 105-1 and the small base station #2 105-2 operate in an inactive mode and receive an active mode request message, the small base station #1 105-1 and the small base station #2 105-2 switch from an inactive mode to an active mode and operate in the active mode to emit RF signals in operation 627-1 and operation 627-2, respectively. The small base station #1 105-1 and the small base station #2 105-2 transmit to the network apparatus 103 a response message to the active mode request, respectively in operation 605. For example, the small base station #1 105-1 and the small base station #2 105-2 may transmit an active mode OK message to the network apparatus in operation 605.

If the network apparatus 103 receives the response message to the active mode request from the small base station #1 105-1 and the small base station #2 105-2, the network apparatus 103 transmits a CSG selection response message to the terminal 101 in operation 607.

The terminal 101 carries out a manual CSG selection operation such that the terminal 101 displays a list of detected small base stations and receives one small base station input by a user in operation 629. Then, the terminal 101 transmits a location registration request message to the selected small base station, for example, the small base station #1 105-1 in operation 609. If the terminal 101 receives a response message to the location registration request message from the small base station #1 105-1 in operation 611, the terminal 101 camps on the small base station #1 105-1 so that the terminal 101 can be provided with a service by the small base station #1 105-1 in operation 631. The response message to the location registration request message transmitted from the small base station #1 105-1 may be a location registration accept message.

The network apparatus 103 determines whether the terminal 101 is camped on a small base station. Here, the small base station, on which the terminal 101 is camped, is a small base station selected by the terminal 101.

When it is determined the terminal 101 camped on a small base station, the network apparatus 103 controls the small base station, on which the terminal 101 is camped, to maintain an active mode, and controls a small base station, on which the terminal 101 is not camped, to switch from an active mode to an inactive mode and to operate in an inactive mode.

As shown in FIG. 6, if the network apparatus 103 receives a CSG selection complete message from the small base station #1 105-1 in operation 613, the network apparatus 103 controls the small base station #1 105-1 which transmitted the CSG selection complete message, i.e., the small base station, on which the terminal 101 is camped, to maintain an active mode.

Further, the network apparatus 103 operates a small base station, on which the terminal 101 is not camped, i.e., the small base station #2 105-2, to switch from an active mode to an inactive mode and to operate in the inactive mode by transmitting an inactive mode request message to the small base station #2 105-2 in operation 615.

If the small base station #2 105-2 receives the inactive mode request message from the network apparatus 103, the small base station #2 105-2 switches from an active mode to an inactive mode and operates in the inactive mode, and transmits to the network apparatus 103 an inactive mode OK message in operation 617.

The above-described exemplary embodiments of the present invention may be recorded in non-transitory computer-readable media including program instructions to implement various operations embodied by a computer. The media may also include, alone or in combination with the program instructions, data files, data structures, or the like. The program instructions included in the media are specially designed and configured for the present invention, but may include typical program instructions that are known and available to computer software programmers in the art. Examples of non-transitory computer-readable media include magnetic media, such as hard disks, floppy disks, and magnetic tape; optical media, such as CD-ROM disks and DVDs; magneto-optical media, such as optical disks; and hardware devices that are specially configured to store and perform program instructions, such as read-only memory (ROM), random access memory (RAM), flash memory, or the like. Examples of program instructions include both machine code, such as produced by a compiler, and higher level code that may be executed by the computer using an interpreter. The above-described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A network apparatus, comprising:
    a node list search unit to search for small base stations accessible to a terminal in response to a request for closed subscriber group (CSG) selection from the terminal;
    a first controller to control the accessible small base stations to operate in an active mode; and
    a second controller to control a first small base station, on which the terminal is camped, from among the accessible small base stations to maintain the active mode, and to control the remaining of the accessible small base stations, on which the terminal is not camped, to switch from the active mode to an inactive mode and to operate in the inactive mode.

2. The network apparatus of claim 1, wherein the second controller enables the first small base station to emit radio frequency (RF) signals, and enables the remaining of the small base stations operating in an inactive mode to not emit RF signals.

3. The network apparatus of claim 1, wherein the node list search unit receives location information of the terminal from the terminal, and searches for small base stations positioned within a specific distance from the terminal based on the location information.

4. The network apparatus of claim 1, wherein the node list search unit receives, from the terminal, identification information of small base stations selected based on a history of access to the small base stations, and searches for small base stations corresponding to the identification information.

5. The network apparatus of claim 1, wherein the node list search unit receives identification information of small base stations to which the terminal is subscribed from a subscribed node list server, and searches for the small base stations to which the terminal is subscribed based on the identification information.

6. The network apparatus of claim 1, wherein the first controller requests at least one of the small base stations to switch into an active mode from an inactive mode, the at least one of the small base stations operating in an inactive mode due to sensing signals from a macro cell during booting.

7. The network apparatus of claim 1, wherein the first small base station is selected by the terminal.

8. A terminal, comprising:
    a communication unit to transmit a closed subscriber group (CSG) selection request to a network apparatus;
    a node detection unit to detect small base stations after receiving a CSG selection response from the network apparatus in response to the CSG request; and
    a node access unit to enter a coverage of a selected small base station by camping on the selected small base station from among the detected small base stations,
    wherein the network apparatus controls a small base station accessible by the terminal to operate in an active mode and to maintain the active mode in which the small base station emits radio frequency (RF) signals, determines which small base station is selected by the terminal to be camped on, and controls remaining small base stations, on which the terminal is determined as not being camped on, to operate in an inactive mode in which the small base station does not emit RF signals.

9. The terminal of claim 8, wherein the communication unit transmits, to the network apparatus, identification information of small base stations selected based on a history of access to the small base stations.

10. The terminal of claim 8, wherein the communication unit transmits, to the network apparatus, identification information of small base stations selected based on location information of the terminal.

11. The terminal of claim 8, wherein the communication unit transmits, to the network apparatus, identification information of small base stations selected based on a history of access to the small base stations and location information of the terminal.

12. A small base station, comprising:
    a controller to determine a mode of the small base station based on whether the small base station senses signals from a macro cell, to control a radio frequency (RF) signal emission based on the determined mode, to maintain an active mode in response to a received signal, and to switch the mode of the small base station in response to a mode switch request received from a network apparatus,
    wherein the mode of the small base station comprises an active mode and an inactive mode,
    wherein the small base station is accessible by a terminal, and
    wherein the network apparatus transmits the mode switch request to switch the small base station to the inactive mode if the network apparatus determines that the terminal is camped on another small base station accessible by the terminal.

13. The small base station of claim 12, wherein the mode switch request enables the small base station, on which the terminal is camped, to operate in the active mode, and enables the small base station, on which the terminal is not camped, to operate in the inactive mode in which the small base station does not emit RF signals.

14. A method for operating a network system, the method comprising:
    searching for small base stations accessible to a terminal in response to a closed subscriber group (CSG) selection request from the terminal;
    controlling the accessible small base stations to operate in an active mode;
    determining whether the terminal is camped on a first small base station, the first small base station being one of the accessible small base stations; and
    controlling the first small base station, on which the terminal is camped, to maintain the active mode, and controlling the remaining accessible small base stations, on which the terminal is not camped, to switch from the active mode to an inactive mode and to operate in the inactive mode.

15. The method of claim 14, further comprising:
    enabling the first small base station to maintain the active mode to emit radio frequency (RF) signals, and enabling the remaining accessible small base stations to operate in the inactive mode, which does not emit the RF signals.

16. The method of claim 14, wherein the searching for small base stations accessible by the terminal comprises:
    receiving location information of the terminal from the terminal; and searching for small base stations positioned within a specific distance from the terminal based on the location information.

17. The method of claim 14, wherein the searching for small base stations accessible by the terminal comprises:
   receiving, from the terminal, identification information of small base stations selected based on a history of access to the small base stations; and
   searching for small base stations corresponding to the identification information.

18. The method of claim 14, wherein the searching for small base stations accessible by the terminal comprises:
   receiving identification information of small base stations to which the terminal is subscribed from a subscribed node list server; and
   searching for the small base stations to which the terminal is subscribed based on the identification information.

19. The method of claim 14, wherein the controlling the small base stations to operate in the active mode comprises:
   requesting the small base stations to switch to the active mode from an inactive mode, the small base stations operating in the inactive mode due to sensing signals from a macro cell during booting.

20. The method of claim 14, wherein the determining comprises determining whether the small base station is selected by the terminal.

\* \* \* \* \*